G. TORRICELLAS.
VEHICLE DIRECTION INDICATOR.
APPLICATION FILED AUG. 19, 1920.

1,376,176.

Patented Apr. 26, 1921.

INVENTOR.
BY GUY TORRICELLAS.
A. B. Bowman
ATTORNEY

UNITED STATES PATENT OFFICE.

GUY TORRICELLAS, OF SAN DIEGO, CALIFORNIA.

VEHICLE DIRECTION-INDICATOR.

1,376,176.  Specification of Letters Patent.  Patented Apr. 26, 1921.

Application filed August 19, 1920. Serial No. 404,577.

*To all whom it may concern:*

Be it known that I, GUY TORRICELLAS, a citizen of the United States, residing at San Diego, in the county of San Diego and State of California, have invented certain new and useful Vehicle Direction-Indicators, of which the following is a specification.

My invention relates to an apparatus for indicating the direction a vehicle is about to take and the objects of my invention are: first, to provide an apparatus of this class which is positioned in the top of the vehicle and out of the way; second, to provide an apparatus of this class which indicates the direction the vehicle is about to take, both in front and behind the vehicle; third, to provide an apparatus of this class which may be readily applied to the various makes of vehicles now in use; fourth, to provide an apparatus of this class in which a light is disclosed making it applicable for use at night as well as during the daytime; fifth, to provide an apparatus of this class which is readily collapsible so that it may be collapsed in short form for shipping and for taking down with the vehicle top and sixth, to provide an apparatus of this class which is very simple and economical of construction, durable, easy to install, easy to operate, efficient in its action and which will not readily deteriorate or get out order.

Figure 1:
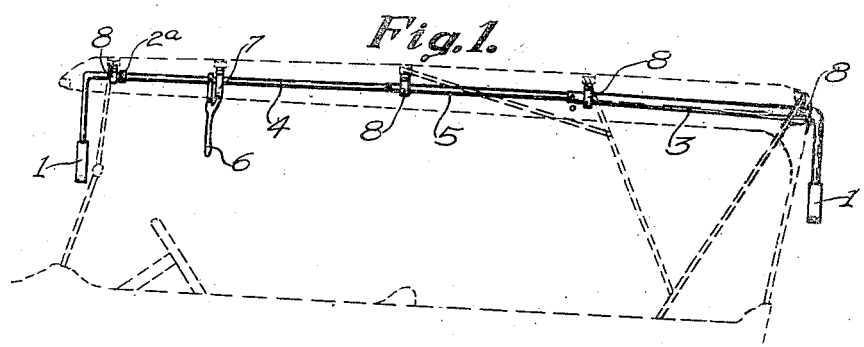
Figure 2:
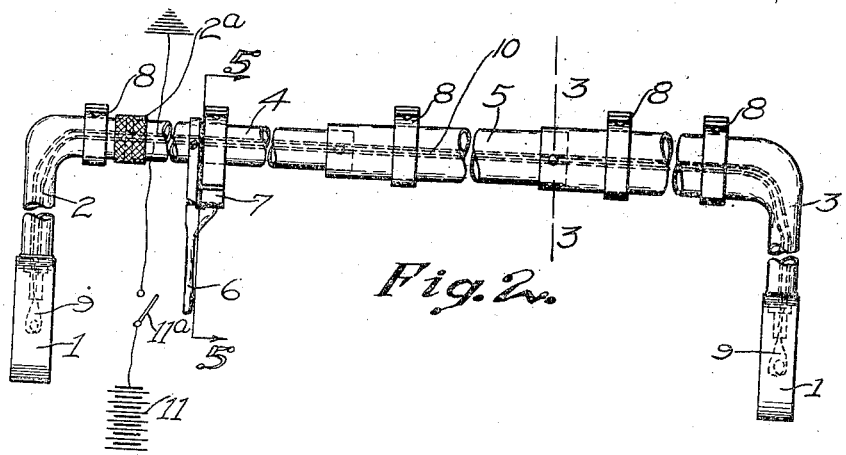
Figure 3:
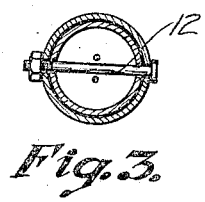
Figure 4:
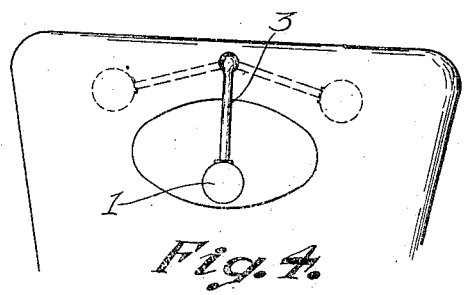
Figure 5:
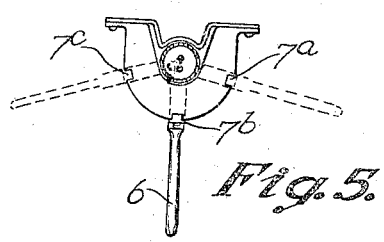

With these and other objects in view as as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of my device shown mounted on the vehicle top which is shown by dotted lines; Fig. 2 is an enlarged side elevational view of the device shown fragmentarily and showing some of the lighting elements diagrammatically; Fig. 3 is a sectional view through 3—3 of Fig. 2 on an enlarged scale; Fig. 4 is a rear end elevational view of the vehicle top showing my device positioned thereon and showing the varying positions for right and left turn by dotted lines and Fig. 5 is a sectional view through 5—5 of Fig. 2.

Similar characters of reference refer to similar parts and portions throughout the several views of the drawings.

The signal members 1, L members 2 and 3, sections 4 and 5, handle member 6, quadrant 7, U supports 8, light bulbs 9, conductor 10 and battery 11 constitute the principal parts and portions of my vehicle direction indicator.

The signaling members 1 are preferably circular casings provided with transparent faces. These members are secured onto the ends of the L members 2 and 3 which are hollow, tubular members adapted for the conductors 10 to pass therethrough and connect with electric light bulbs 9 which are mounted centrally in the members 1 and these members 2 and 3 are connected together so that they turn together but will telescope relatively to each other by means of sections 4 and 5 of different sized pipe so that the one section fits into the other and are secured together at their ends by means of bolts 12. The sections 2 and 4 are connected by means of a threaded coupling 2ª which is adapted to screw onto the adjacent ends of the members 2 and 4 and hold them in certain relative position to each other. The apparatus is supported on the top of the vehicle by means of a plurality of U clips 8 which pass around the sections and are secured to the lower sides of the bows of the top and on one of the bows is secured a quadrant 7 provided with three notches 7ª, 7ᵇ and 7ᶜ shown best in Fig. 5 of the drawings. Secured to the section 4 adjacent the front and in position, readily accessible to the operator, is the handle member 6 which is provided with a spring catch which is adapted to operate on the quadrant and engage the notch for holding the signals 1 in varying positions to the right or left or straight down in a neutral position. The conductors 10 pass through the sections and connect with the battery 11 and ground, thus providing for electrically lighting the signal at all times, however, the conductor to the battery is provided with a switch 11ª adapted to break the circuit to the signaling apparatus when it is not desired to use the same in the daytime. It will be noted that the signal member 1 is preferably painted a color liable to attract attention.

Having thus described my invention what I claim as new and desire to secure by Letters Patent is:

1. A signaling apparatus for vehicles, including a plurality of sections connected together in approximate alinement, the end ones being provided with right angle turns, a signaling device secured on the extended end of said right angle turn, and means for securing them to the bows of the top of the vehicle.

2. A signaling apparatus for vehicles, including a plurality of telescopical sections connected together in approximate alinement, the end ones being provided with right angle turns, a signaling device secured on the extended end of said right angle turn, means for securing them to the bows of the top of the vehicle, a quadrant secured to one of the bows of the vehicle top provided with notches and a handle secured to one of said sections adapted to engage said notches for holding the signaling members in varying positions.

3. A signaling apparatus for vehicles, including a plurality of hollow, telescopical sections connected together in approximate alinement, the end ones being provided with right angle turns, a signaling device secured on the extended end of said right angle turn, means for securing them to the bows of the top of the vehicle, a quadrant secured to one of the bows of a vehicle provided with notches, a handle secured to one of said sections adapted to engage said notches for holding the signaling members in varying positions, electrical conductors mounted in said sections and electric light bulbs mounted in each signaling device and electrically connected with said conductor.

4. An apparatus of the class described, including a hollow collapsible longitudinal member provided with right angle turns at each end secured to the bows of a vehicle top and the turns extending out at the opposite ends of said top, transparent signaling members secured on said extended ends and electrical means for illuminating said transparent members.

5. An apparatus of the class described, including a hollow collapsible longitudinal member provided with right angle turns at each end secured to the bows of a vehicle top and the turns extending out at the opposite ends of said top, transparent signaling members secured on said extended ends, electrical means for illuminating said transparent members and means to facilitate the turning of said longitudinal member and holding it in certain tortional positions.

In testimony whereof I have hereunto set my hand at San Diego, California this 14th day of August 1920.

GUY TORRICELLAS.